United States Patent [19]

Lichte

[11] 4,043,411

[45] Aug. 23, 1977

[54] ROTARY ROCK BIT WITH THE BEARING PIN FUSED TO THE ROCK BIT ARM

[75] Inventor: Carl Laurent Lichte, Dallas, Tex.

[73] Assignee: Dresser Industries, Inc., Dallas, Tex.

[21] Appl. No.: 741,167

[22] Filed: Nov. 12, 1976

[51] Int. Cl.² .............................................. E21B 9/08
[52] U.S. Cl. .............................. 175/369; 76/108 A; 175/375
[58] Field of Search .............. 175/375, 412, 366, 413, 175/369; 76/101 E, DIG. 5, 108 R, 108 A; 219/148; 308/8.2

[56] References Cited

U.S. PATENT DOCUMENTS

| | | | |
|---|---|---|---|
| 1,989,261 | 1/1935 | Behnke | 308/8.2 |
| 2,086,397 | 7/1937 | Thaheld | 175/366 |
| 2,165,584 | 7/1939 | Smith et al. | 308/8.2 |
| 2,728,559 | 12/1955 | Boice et al. | 175/375 |
| 3,086,601 | 4/1963 | Galle et al. | 175/356 |
| 3,239,431 | 3/1966 | Knapp | 175/369 |
| 3,907,191 | 9/1975 | Lichte | 76/108 A |

Primary Examiner—James A. Leppink
Attorney, Agent, or Firm—Eddie E. Scott

[57] ABSTRACT

A rotary rock bit is constructed from at least one rock bit arm and a separate bearing pin. The rock bit arm includes a curved shirttail surface, a plane cutter receiving surface, and a mounting passage extending through said rock bit arm from said cutter receiving surface to said shirttail surface. The bearing pin includes a bearing section and a mounting section. The mounting section is positioned in the mounting passage of the rock bit arm thereby forming a seam between the mounting section of the bearing pin and the mounting passage in the rock bit arm. The mounting section of the bearing pin is fused to the rock bit arm using a beam of energy. The beam of energy is directed from an energy source located on the plane cutter receiving surface side of the rock bit arm. The plane cutter receiving surface is maintained substantially perpendicular to the beam of energy and the beam source is maintained substantially at a fixed distance from the cutter receiving surface during the fusing operation.

13 Claims, 6 Drawing Figures

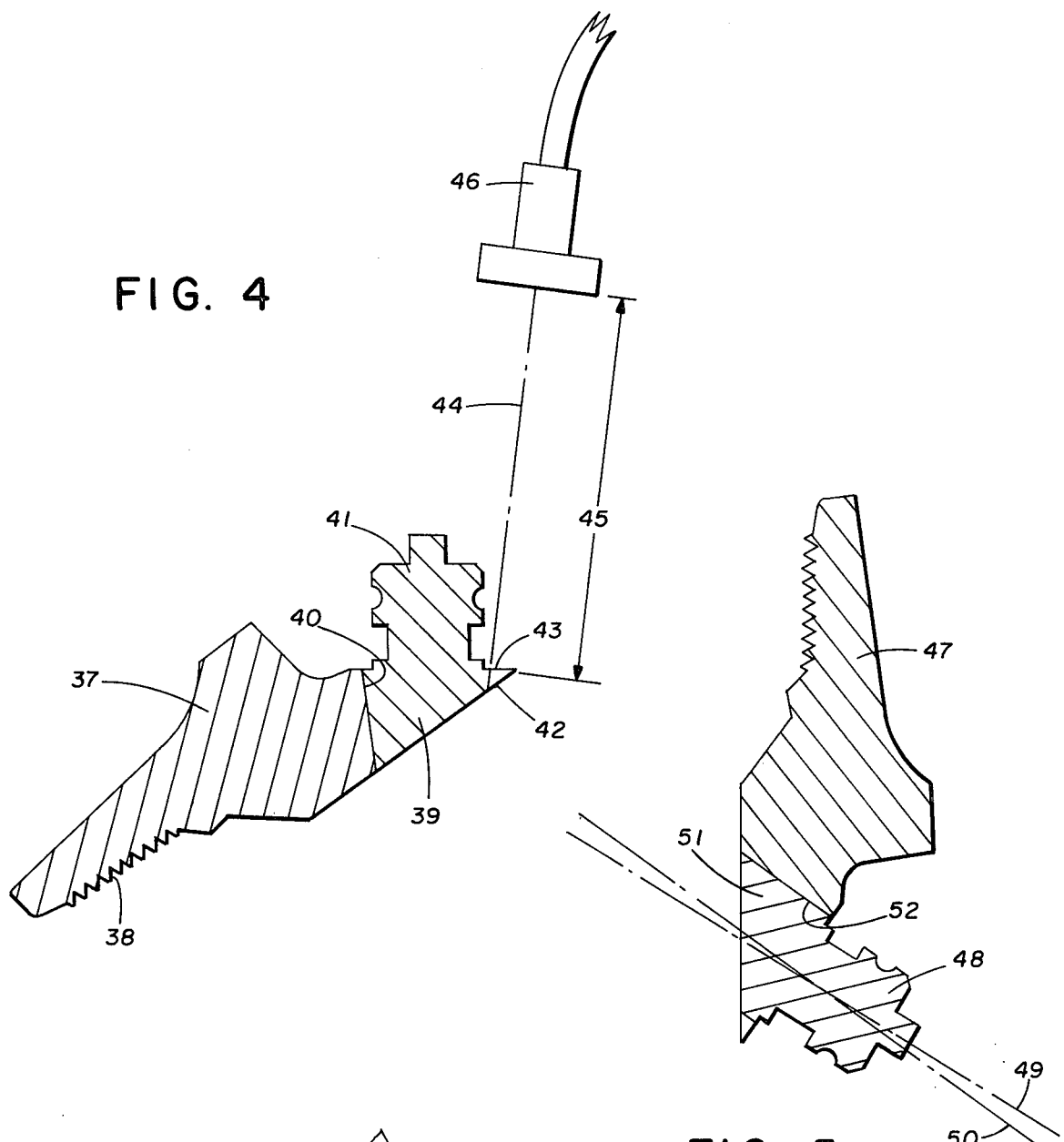
FIG. 4
FIG. 5
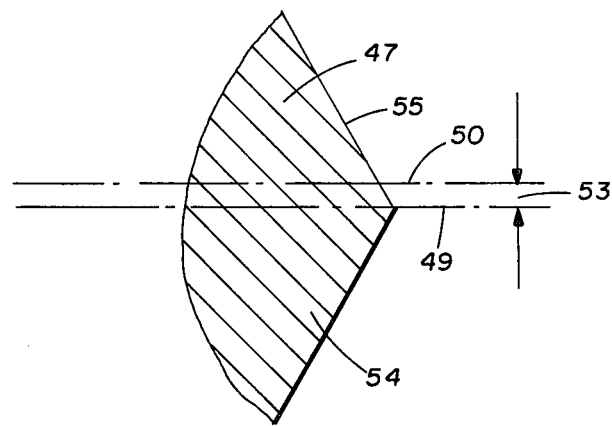
FIG. 6

ROTARY ROCK BIT WITH THE BEARING PIN FUSED TO THE ROCK BIT ARM

BACKGROUND OF THE INVENTION

The present invention relates, in general, to the art of earth boring and more particularly to a rotary rock bit constructed from at least one rock bit arm and a separate bearing journal or bearing pin. A rotary rock bit, in general, consists of at least one rock bit arm adapted to be connected to a rotary drill string. A cutter means in the form of a rotary cutter is mounted on a bearing pin extending from the rock bit arm. The cutter contacts the formations during the drilling operation to form the desired borehole. The present invention provides a rotary rock bit that is constructed from an individual rock bit arm and a separate bearing pin. The rock bit arm and bearing pin are joined together using a beam of energy.

The cutter is rotatably mounted on the bearing pin and a seal unit may be positioned between the cutter and the bearing pin or rock bit arm. The seal unit should function to provide a seal between the rock bit arm and the cutter to maintain lubricant within the bearing area and prevent fluids in the borehole from entering the bearing area. The seal should run against a smooth surface in order to maintain the integrity of the seal. The cutter movement during drilling is complex and includes rapid axial and radial as well as wobbling motions. The complex cutter movement increases the difficulty in providing a satisfactory seal.

The general concept of providing a bearing pin separate from the journal was previously known; however, the novel means of joining the bearing pin to the rock bit arm was not known prior to applicant's present invention. The present invention provides an improved rotary rock bit by allowing the joining of optimum bearing steel to optimum rock bit arm steel. The problems and expense of manufacturing are reduced by allowing the rock bit arm to be constructed of an appropriate grade of steel. The bearing pin can be machined separate and apart from the rock bit arm. The metallurgical processing is simplified because the bearing pin can be treated separate from the rock bit arm. The bearing pin material need not be compatible with the arm material for heat treating process. Various bearing angles and offsets are provided.

DESCRIPTION OF PRIOR ART

In U.S. Pat. No. 2,076,002 to C. E. Reed, patented Apr. 6, 1937, an anti-friction bearing assembly for earth boring drills is shown. The earth boring drill includes a cutter support arm and a separate spindle. The spindle is positioned in a bore extending through the cutter support arm and retained therein by a weld. The weld is located on the outside portion of the cutter support arm at the end of the spindle away from the cone cutter. The weld fills a support recess.

SUMMARY OF THE INVENTION

The present invention provides a rotary rock bit that includes a rock bit arm and a separate bearing journal or bearing pin. The rock bit arm has a curved shirttail surface, a plane cutter receiving surface, and an annular mounting passage extending from said cutter receiving surface. The bearing pin includes a bearing pin section for receiving a rotary cutter and a mounting section. The mounting section is positioned in the mounting passage of the rock bit arm thereby forming a seam between the mounting section and the mounting passage of the rock bit arm. The seam may be any single curve surface, but is preferably a cylinder with axis coincident with bearing pin. A energy beam source is positioned on the cutter receiving surface side of the rock bit arm. The beam of energy and the seam are aligned. Relative movement between the beam of energy and the seam fuses the bearing pin to the rock bit arm. The cutter receiving surface is preferably located substantially perpendicular to the beam of energy and the beam source is maintained substantially at a fixed distance from the seam during the fusing operation. This places the soundest part of the weld in the region that receives the highest stress. The lower end of the weld nugget can be machined off with the shirttail. A cosmetic pass of the beam of energy insures a relatively smooth flat surface for receiving rotating parts of the cutter without machining or other clean up operations. The above and other features and advantages of the present invention will become apparent from a consideration of the following detailed description of the invention when taken in conjunction with the accompanying drawings.

BRIEF DESCRIPTION OF THE DRAWINGS

FIG. 4 is an illustration of still another embodiment of the present invention.

FIG. 5 is an illustrative sketch of a side view of a portion of a rock bit arm showing bearing pin angle and offset.

FIG. 6 is an illustrative sketch of a top view of the portion of a rock bit arm shown in FIG. 5.

DETAILED DESCRIPTION OF THE INVENTION

Figure 1:
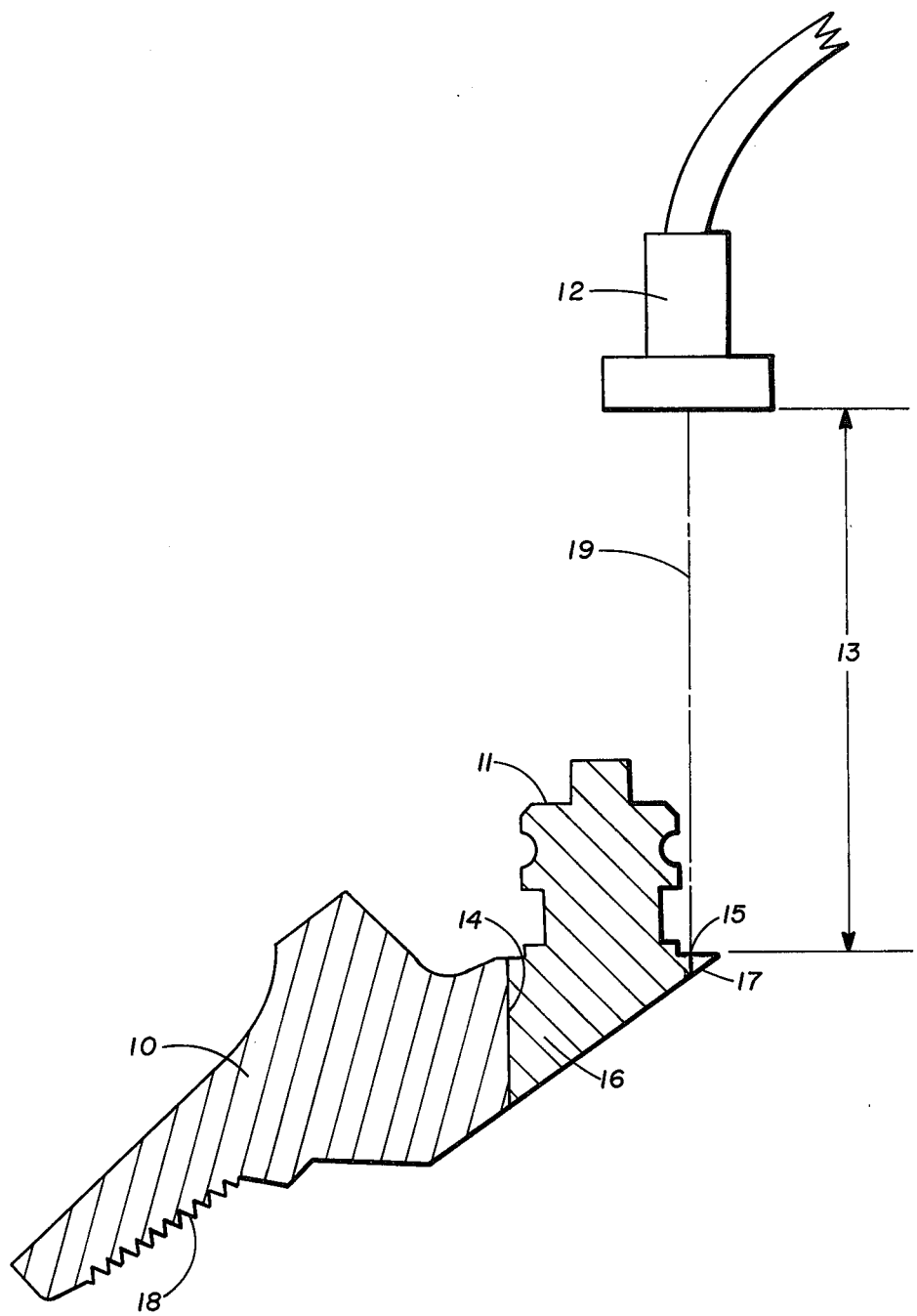
FIG. 1 is an illustration of one arm of a rock bit with a separate bearing pin being fused to the rock bit arm.

Referring now to the drawings and in particular to FIG. 1, a sectional view of one arm 10 of a rotary rock bit is shown. It is to be understood that more than one arm may be used to construct a rock bit and that the structure of the other arms would be substantially identical to the arm 10. The bit includes a conventional threaded portion 18 that allows the bit to be connected to the lower end of a rotary drill string (not shown). The bit also includes a central passageway extending along the central axis of the bit to allow the drilling fluid to enter from the upper section of the drill string (not shown) immediately above and pass downward to the bottom of the well bore to flush cuttings and drilling debris from the well bore.

A bearing pin 11 is constructed and processed separately from the arm 10. The bearing pin 11 can be machined separate and apart from the rock bit arm 10. The metallurgical processing to obtain desired physical properties is simplified because the bearing pin 11 can be treated separately from the rock bit arm 10. A passage 14 is machined into the arm 10. The passage 14 extends from the shirttail 17 through the arm 10. The bearing pin 11 includes a mounting section 16. The mounting section 16 is assembled in position in the passage 14. The annular mounting surface of the mounting section 16 of the bearing pin 11 is located in the passage 14. The annular mounting surface of the passage 14 and the annular mounting surface of the bearing pin 11 form a seam. A beam 19 of high-velocity electrons is directed into the seam to fuse the bearing pin 11 to the arm 10.

The beam of electrons 19 is produced by an electron beam gun 12. The electron beam gun 12 is located on the cutter receiving side of the rock bit arm 10. The rock bit arm 10 includes a cutter receiving surface 15. The beam of electrons 19 is maintained substantially coincident with the elements which describe the seam. Preferably the beam is perpendicular to the cutter receiving surface and the seam is round in cross section. The beam 19 is maintained at substantially a fixed distance 13 from the cutter receiving surface 15. This insures an optimum weld. The strongest part of the weld will be located on the part of the connection between the bearing pin and arm that receives the greatest stress. The beam 19 is caused to move coincident with the seam by relative movement between the beam 19 and the seam. The beam has a high intensity (10 KW/nn$^2$) and a high-power capacity (60 KW). The welding operation is conventionally carried out in a vacuum chamber; however, it is to be understood that a laser beam could also be used and that a vacuum chamber might not be necessary. After the initial welding operation has been completed fusing the bearing pin 11 to the arm 10 a second or cosmetic pass of the beam along the seam provides a smooth notch-free surface.

Figure 2:
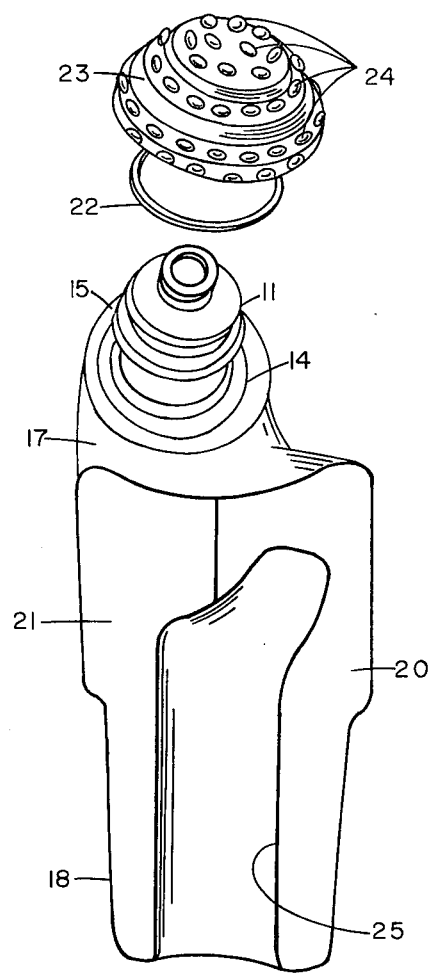
FIG. 2 is a pictorial illustration of the rock bit arm and bearing pin shown in FIG. 1 with a rotary cutter and seal adapted to be mounted on the bearing pin.

Referring now to FIG. 2, the rock bit arm 10 and bearing pin 11 are shown together with a rotary cutter 23 and seal 22. The cutter 23 is adapted to be rotatably positioned on the bearing pin 11 extending from the arm 10. The cutter 23 is adapted to disintegrate the earth formations as the bit is rotated. The cutting structure 24 on the surface of cutter 23 contacts and disintegrates the earth formations in a manner that is well known in the art. The cutting structure 24 shown is in the form of tungsten carbide inserts. However, it is to be understood that other cutting structure such as steel teeth may be used as a cutting structure on the cone cutter 23. The bit also includes a central passageway 25 extending along the central axis of the bit to allow the drilling fluid to enter from the upper section of the drill string (not shown) immediately above and pass downward to the bottom of the well bore to flush cuttings and drilling debris from the well bore. It is to be understood that more than one arm may be used to construct a rock bit and that the structure of the other arms would be substantially identical to the arm 10. The other arms would be connected to the arm along the faces 20 and 21.

A plurality of bearing systems will be located in the bearing area between the cutter 23 and the bearing pin 11. The bearing systems in the bearing area may include a roller bearing system, a ball bearing system, an innerfriction bearing, and a thrust button. If used, the seal 22 is positioned between the cutter 23 and the arm 10. This seal 22 retains lubricant in the bearing area around the bearing systems and prevents any materials in the well bore from entering the bearing area. The seal 22 must provide a satisfactory seal between the rock bit arm and the cutter to maintain lubricant within the bearing area and prevent fluids in the borehole from entering the bearing area. The seal should run against a smooth surface in order to maintain the integrity of the seal. The cutter movement during drilling is complex and includes rapid axial and radial as well as wobbling motions. The complex cutter movement increases the difficulty in providing a satisfactory seal. The seam 14 is uniform and smooth and provides a good receiving surface.

The electron beam 19 penetrates substantially through the seam 14. The energy from the electron beam is applied rapidly thereby preventing heat build-up and reducing the danger of damaging the portions of the rock bit that have a low tolerance to heat such as carburized surfaces. The electron beam 19 does not add material to produce a build-up of deposit along the seam 14 and there is very little, if any, warpage. The present invention provides an improved rotary rock bit by allowing the joining of optimum bearing steel to optimum rock bit arm steel. The problems and expense of manufacturing are reduced by allowing the rock bit arm to be constructed of an appropriate grade of steel. The bearing pin can be machined separately and apart from the rock bit arm. The carburizing or other process is simplified because the bearing pin can be treated separate from the rock bit arm.

Figure 3:
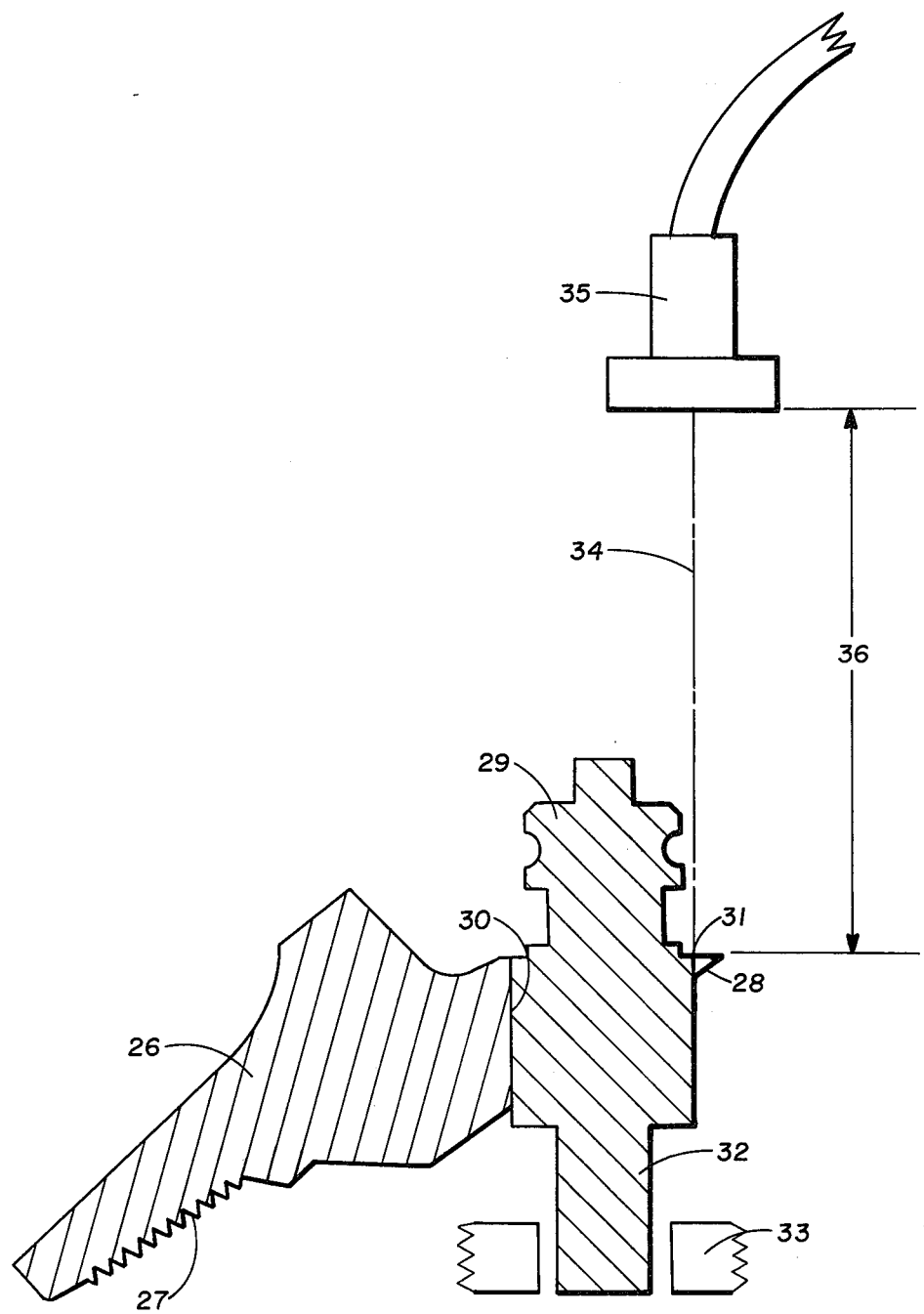
FIG. 3 is an illustration of another embodiment of the present invention.

Referring now to FIG. 3, a sectional view of one arm 26 of another embodiment of a rotary rock bit constructed in accordance with the present invention is shown. It is to be understood that more than one arm may be used to construct a rock bit and that the structure of the other arms would be substantially identical to the arm 26. A cutter (not shown) will be rotatably positioned on bearing pin 29 extending from the arm 26.

The bit includes a conventional threaded portion 27 that allows the bit to be connected to the lower end of a rotary drill string (not shown). The bit also includes a central passageway extending along the central axis of the bit to allow the drilling fluid to enter from the upper section of the drill string (not shown) immediately above and pass downward to the bottom of the well bore to flush cuttings and drilling debris from the well bore. A plurality of bearing systems will be located in the bearing area between the cutter and the bearing pin 29. The bearing systems in the bearing area may include ball bearing systems, roller bearing systems, and friction bearing systems.

The bearing pin 29 is constructed and processed separately from the arm 26. The bearing pin 29 can be machined separate and apart from the rock bit arm 26. The metallurgical processing is simplified because the bearing pin can be treated separately from the rock bit arm. A passage 30 is machined into the arm 26. The passage 30 extends from the shirttail 28 through the arm 26. The bearing pin 29 includes a mounting section. The mounting section is assembled in position in the passage 30. The annular mounting surface of the mounting section of the bearing pin 29 is located in the passage 30. The annular mounting surface of the passage 30 and the annular mounting surface of the bearing pin 29 form a seam. The mounting section of the bearing pin 29 includes a tang 32. The tang 32 is mounted in a chuck 33. A beam 34 of high-velocity electrons is directed into the seam to fuse the bearing pin 29 to the arm 26. The chuck 33 is used to rotate the bearing pin 29 and arm 26 during the fusing operation. Once the bearing pin 29 is fused to the arm 26, the tang 32 will be machined off flush with the shirttail 28.

The beam of electrons 34 is produced by an electron beam gun 35. The electron beam gun 35 is located on the cutter receiving side of the rock bit arm 26. The rock bit arm 26 includes a cutter receiving surface 31. The beam of electrons 34 is maintained substantially perpendicular to the cutter receiving surface 31 and the beam 34 is maintained at substantially a fixed distance 36 from the cutter receiving surface 31. This insures an optimum weld. The strongest part of the weld will be located on the portion of the joint between the bearing pin and arm that receives the greatest stress. The beam 34 is caused to move in the plane of the seam by relative movement between the beam 34 and the seam. The beam has a high-intensity (10 KW/nn$^2$) and a high-power capacity (60 KW). The electron beam 34 penetrates substantially through the seam. The energy from the electron beam 34 is applied rapidly thereby preventing heat build-up and reducing the danger of damaging the portions of the rock bit that have a low tolerance to heat such as areas receiving low temperature tempering. The electron beam 34 does not add material to produce a build-up of deposit along the seam and there is very little, if any, warpage.

The welding operation is conventionally carried out in a vacuum chamber; however, it is to be understood that a laser beam could also be used and that a vacuum chamber might not be necessary. After the initial welding operation has been completed, fusing the bearing pin 29 to the arm 26 a second or cosmetic pass of the beam along the seam provides a smooth, notch-free surface. The tang 32 is machined off flush with the shirttail 28. The present invention provides an improved rotary rock bit by allowing the joining of optimum bearing steel to optimum rock bit arm steel. The problems and expense of manufacturing are reduced by allowing the rock bit arm to be constructed of an appropriate grade of steel. The bearing pin can be machined separately and apart from the rock bit arm. The metallurgical processing is simplified because the bearing pin can be treated separate from the rock bit arm and the two materials need not be compatible.

Referring now to FIG. 4, still another embodiment of the present invention is illustrated. A somewhat conical passage 40 is machined into the arm 37 of a rock bit. The passage 40 extends from the shirttail 42 through the arm 37. The bearing pin 41 includes a tapered mounting section 39. The tapered mounting section 39 is assembled in position in the conical passage 40. The annular mounting surface of the passage 40 and the annular mounting section 39 form a seam. A beam 44 of high-velocity electrons is directed into the seam to fuse the bearing pin 41 to the arm 37. The beam of electrons 44 is maintained substantially coincident with the elements which describe the seam. The beam 44 is maintained at substantially a fixed distance 45 from the cutter receiving surface 43. This insures an optimum weld. The strongest part of the weld will be located on the part of the connection between the bearing pin and arm that receives the greatest stress. The beam 19 is caused to move coincident with the seam by relative movement between the beam 19 and the seam.

The bearing pin angle and offset of the cone axes of rotation are important features in rock bit design. In the embodiments shown in FIGS. 1–4, the bearing pin angle and offset is provided by having the central axis of the mounting section of the bearing pin concentric with the central axis of the bearing pin journal section. The arm segment is machined for various desired bearing pin angles and offsets. As shown in FIGS. 5 and 6, different bearing pin angles and offsets can be provided by making the central axis of the mounting section of the bearing pin non-concentric with the central axis of the journal portion of the bearing pin. As shown in FIG. 5, the rock bit arm 47 includes a mounting passage 52. The bearing pin includes a bearing pin mounting section 51 and a bearing pin journal section 48. The central axis 50 of the bearing pin mounting section 51 is not concentric with central axis 49 of the bearing pin journal portion 48. It will be appreciated that various bearing pin angles can be provided by constructing the bearing pin so that the central axis 50 and central axis 49 have an appropriate relationship.

Referring now to FIG. 6, a top view of a section of the arm 47 taken horizontally through the arm 47 is illustrated. The central axis 49 of the bearing pin mounting section 51 intersects the line formed by the meeting of the V-faces 54 and 55. This is the zero offset position. The central axis 50 of the journal portion 48 of the bearing pin is positioned offset from the central axis 49. This provides the rolling cutter mounted on the bearing pin with an offset. The amount of offset is shown by 53 in FIG. 6.

The embodiments of the invention in which an exclusive property or privilege is claimed are defined as follows:

1. A method of constructing a rotary rock bit, comprising the steps of:
   providing a rock bit arm, said rock bit arm having a side with a shirttail surface and a side with a cutter receiving surface;
   providing a bearing pin, said bearing pin having a bearing section and a mounting section with at least a portion of said mounting section being larger in diameter than said bearing section;
   providing a mounting passage in said rock bit arm, said mounting passage extending from said cutter receiving surface;
   positioning said mounting section of said bearing pin in said mounting passage of said rock bit arm thereby forming a seam between said mounting section of said bearing pin and said mounting passage in said rock bit arm;
   aligning a beam of energy with said seam and directing said beam of energy into said seam from the side of the rock bit arm having said cutter receiving surface;
   causing relative movement between said beam of energy and said seam to fuse said bearing pin to said rock bit arm; and
   mounting a cutter upon said bearing pin.

2. The method of claim 1 wherein an energy source is used to direct the beam of energy into said seam and the energy source is maintained substantially at a fixed distance from said cutter receiving surface during said step of causing relative movement between said beam of energy and said seam to fuse said bearing pin to said rock bit arm.

3. The method of claim 2 including the additional steps of again directing a beam of energy into said seam and causing relative movement between said beam of energy and said seam after said bearing pin has been fused to said rock bit arm, to provide a smooth surface.

4. The method of claim 3 wherein said beam of energy is projected all the way through said mounting passage during the step of causing relative movement between said beam of energy and said seam to fuse said bearing pin to said rock bit arm.

5. The method of claim 4 wherein said beam is maintained substantially perpendicular to said cutter receiving surface to fuse said bearing pin to said rock bit arm.

6. The method of claim 5 wherein said bearing section has a centerline and said mounting section has a centerline and including the step of constructing said bearing pin so that said centerlines are inclined to each other to provide a desired bearing pin angle.

7. The method of claim 6 wherein said centerlines are displaced from each other to provide offset.

8. The method of claim 7 wherein said beam is maintained at a constant distance and angle to the centerline of the bearing pin mounting section.

9. A method of constructing a rotary rock bit, comprising the steps of:
   providing a rock bit arm, said rock bit arm having a shirttail surface and a cutter receiving surface;
   providing a bearing pin, said bearing pin having a bearing section with a bearing surface and a mounting section with an annular mounting surface with at least a portion of said mounting section being larger in diameter than said bearing section;
   providing a mounting passage in said rock bit arm, said mounting passage having an annular mounting surface extending from said cutter receiving surface;
   positioning said mounting section of said bearing pin in said mounting passage of said rock bit arm thereby forming a seam between said mounting surface of said bearing pin and said mounting surface of said mounting passage in said rock bit arm;
   directing a beam of energy from an energy source into said seam;
   causing relative movement between said beam of energy and said seam while maintaining said energy source at substantially a fixed distance from said seam to fuse said mounting surface of said bearing pin to said mounting surface of said mounting passage; and
   positioning a cutter upon said bearing pin.

10. The method of claim 9 including the step of maintaining said beam substantially perpendicular to said cutter receiving surface during said step of causing relative movement between said beam of energy and said seam.

11. The method of claim 10 including the additional steps of again directing a beam of energy into said seam and causing relative movement between said beam of energy and said seam after said bearing pin has been fused to said rock bit arm, to provide a smooth surface for said seal unit.

12. A rotary rock bit, comprising:
   at least one rock bit arm, said rock bit arm having a shirttail surface and a cutter receiving surface;
   a mounting passage in said rock bit arm extending from said cutter receiving surface;
   a bearing pin adapted to be connected to said rock bit arm;
   a bearing section on said bearing pin, said bearing section having a maximum diameter;
   a mounting section on said bearing pin, said mounting section having at least a portion with a diameter larger than said maximum diameter portion of said bearing section with said mounting section being positioned in said mounting passage;
   a weld connecting said mounting section of said bearing pin to said rock bit arm, said weld extending from said cutter receiving surface a substantial distance into said mounting passage; and
   a rotary cutter mounted on said bearing pin.

13. A rotary rock bit, comprising:
   at least one rock bit arm, said rock bit arm having a shirttail surface and a cutter receiving surface;
   a mounting passage extending through said rock bit arm from said cutter receiving surface to said shirttail surface, said mounting passage having an annular mounting surface;
   a bearing pin adapted to be connected to said rock bit arm, said bearing pin having a bearing section and a mounting section, said mounting section having an annular mounting surface positioned in said mounting passage;
   a weld fusing said annular mounting surface of said mounting passage in said rock bit arm to said annular mounting surface of said mounting section of said bearing pin, said weld extending from said cutter receiving surface a substantial distance into said mounting passage;
   a cutter mounted on said bearing pin; and
   a seal between said cutter and said cutter receiving surface.

* * * * *